United States Patent
Cho et al.

(10) Patent No.: US 11,581,548 B2
(45) Date of Patent: Feb. 14, 2023

(54) MANUFACTURING METHOD OF SUPPORT FOR CATALYST OF FUEL CELL

(71) Applicants: Hyundai Motor Company, Seoul (KR); Kia Corporation, Seoul (KR)

(72) Inventors: Geon Hee Cho, Uijeongbu-si (KR); Ji Hoon Yang, Gyeonggi-do (KR); Kook Il Han, Gyeonggi-do (KR); Jin Seong Choi, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/487,683

(22) Filed: Sep. 28, 2021

(65) Prior Publication Data
US 2022/0166032 A1 May 26, 2022

(30) Foreign Application Priority Data
Nov. 24, 2020 (KR) .................. 10-2020-0158596

(51) Int. Cl.
*H01M 4/90* (2006.01)
*H01M 4/86* (2006.01)
*H01M 4/88* (2006.01)
*H01M 8/1004* (2016.01)

(52) U.S. Cl.
CPC ....... *H01M 4/9083* (2013.01); *H01M 4/8605* (2013.01); *H01M 4/8657* (2013.01); *H01M 4/88* (2013.01); *H01M 4/9016* (2013.01); *H01M 8/1004* (2013.01)

(58) Field of Classification Search
CPC ................................... H01M 8/1004
See application file for complete search history.

(56) References Cited

U.S. PATENT DOCUMENTS

| 8,628,871 B2 | 1/2014 | Frey et al. |
| 2013/0236816 A1* | 9/2013 | Jung ...................... H01M 4/96 502/439 |

FOREIGN PATENT DOCUMENTS

| KR | 101433703 B1 | 8/2014 |
| KR | 101946446 B1 | 2/2019 |
| WO | 2012-067421 A2 | 5/2012 |

* cited by examiner

*Primary Examiner* — Brian R Ohara
(74) *Attorney, Agent, or Firm* — Fox Rothschild LLP

(57) ABSTRACT

Disclosed herein is a method of manufacturing a support for a catalyst of a fuel cell. The method may include preparing an admixture including a carbon material and a cerium precursor into a reactor, providing the admixture in a reactor, raising a temperature of the reactor to a predetermined temperature, and introducing water vapor into the reactor to perform an activation reaction of the carbon material.

14 Claims, 2 Drawing Sheets

MANUFACTURING METHOD OF SUPPORT FOR CATALYST OF FUEL CELL

CROSS-REFERENCE TO RELATED APPLICATION

This application claims under 35 U.S.C. § 119(a) the benefit of priority to Korean Patent Application No. 10-2020-0158596 filed on Nov. 24, 2020, the entire contents of which are incorporated herein by reference.

TECHNICAL FIELD

The present invention relates to a manufacturing method of a support for a catalyst of a fuel cell.

BACKGROUND

Electrodes of a fuel cell include electrode catalysts, antioxidants, and ionomers. The electrode catalyst includes a support and a catalyst metal supported thereon.

The support is generally a carbon-based material, and in order to increase performance and durability of a membrane-electrode assembly, technologies for increasing a specific surface area and a pore size of the carbon-based material, controlling a shape thereof, and doping a heterogeneous element have being developed.

The antioxidant may be added by distributing a powder such as cerium oxide in an electrode slurry. However, when the antioxidant is not uniformly distributed and is added in the form of a powder, a particle size of the antioxidant may not be sufficient for improving chemical durability of a fuel cell.

SUMMARY

In one aspect, provided is a method of manufacturing a support for a catalyst of a fuel cell, such that a specific surface area and a pore size of the fuel cell may be increased.

In another aspect, provided is a method capable of decreasing a temperature of an activation process of a support.

In still another aspect, provided is a method capable of significantly improving chemical durability of a fuel cell by supporting nano-sized cerium oxide on a support.

Objectives of the present invention are not limited to the above-described objectives, and other objectives of the present invention, which are not mentioned, can be understood by the following description and also will be apparently understood through embodiments of the present invention. Further, the objectives of the present invention can be implemented by means described in the appended claims and a combination thereof.

In one preferred aspect, provided is a method of manufacturing a support for a catalyst of a fuel cell. The method may include preparing an admixture including a carbon material and a cerium precursor; providing the admixture into a reactor, increasing a temperature of the reactor to a predetermined temperature, and introducing water vapor into the reactor to perform an activation reaction of the carbon material.

The term "cerium precursor" as used herein refers a compound including cerium metal component, which may be converted into an active cerium material, e.g., cerium oxide. In certain embodiments, the cerium precursor may be converted into cerium oxide under a specific condition.

For example, when the cerium precursor is activated in the process by heating, raising the temperature and reacting with water molecule (e.g., vapor), the cerium precursor may be converted into cerium oxide. Exemplary cerium precursor may include, but is not limited to, cerium nitrate, cerium nitrate hydrate, cerium acetylacetonate, cerium acetylacetonate hydrate, or the like.

An average particle size of the carbon material may be less than or equal to about 500 μm.

A specific surface area of the carbon material may be less than or equal to about 100 $m^2/g$.

The carbon material may contain one or more e selected from the group consisting of carbon black, carbon nanotubes, carbon nanofibers, graphite carbon, graphene, and graphene oxide.

The cerium precursor may include cerium nitrate (Ce$(NO_3)_3$), cerium nitrate hydrate (Ce$(NO_3)_3 \cdot 6H_2O$), and a combination thereof.

The mixture may include an amount of 100 parts by weight of the carbon material, and an amount of about 5 to 20 parts by weight of the cerium precursor.

A temperature of the reactor may be increased to a predetermined temperature while an inert gas is injected into the reactor.

The predetermined temperature may range from about 600° C. to about 950° C.

The temperature of the reactor may be raised at a rate ranging from about 10° C./min to about 20° C./min.

The e pores and a specific surface area of the carbon material may be increased through the activation reaction.

A pore size of the activated carbon material may range from about 2 nm to about 8 nm.

The cerium precursor may be supported on the carbon material which is activated in a form of cerium oxide.

An average particle size of the cerium oxide may be less than or equal to about 100 nm.

In an aspect, provided is a method of manufacturing a catalyst for a fuel cell. The method may include providing a catalyst metal on the support manufactured by the method described herein.

Other aspects of the present invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
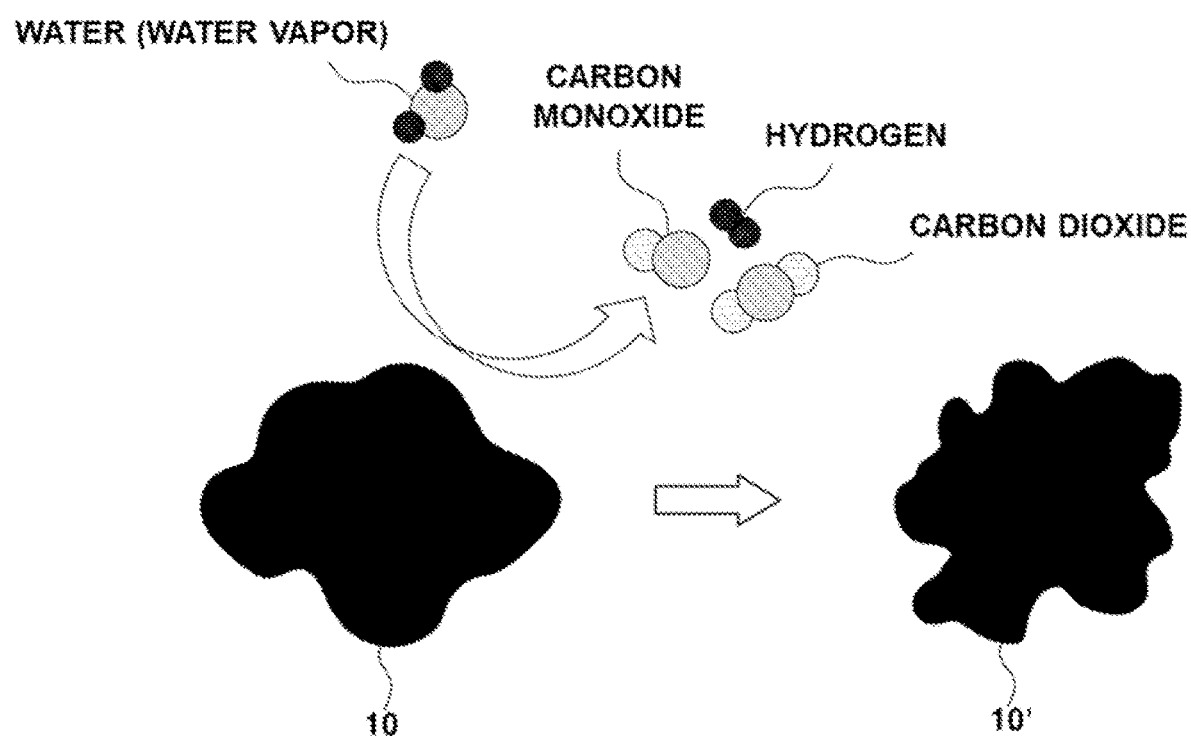
FIG. 1 shows an exemplary activation reaction of a carbon material according to an exemplary embodiment of the present invention.

It should be understood that the appended drawings are not necessarily to scale, presenting a somewhat simplified representation of various preferred features illustrative of the basic principles of the present invention. The specific design features of the present invention as disclosed herein, including, for example, specific dimensions, orientations, locations, and shapes will be determined in part by the particular intended application and use environment.

DETAILED DESCRIPTION

The above and other objectives, features, and advantages of the present invention will become more apparent from the following description of preferred embodiments with reference to the accompanying drawings. However, the present invention is not limited to the embodiments disclosed herein and may be implemented in other forms. The embodiments disclosed herein will be provided to make this invention thorough and complete, and will fully convey the spirit of the present invention to those skilled in the art.

In describing each drawing, similar reference numerals are assigned similar components. In the accompanying drawings, dimensions of structures are shown in an enlarged scale for clarity of the present invention. Although the terms "first," "second," and the like may be used herein to describe various components, these components should not be limited to these terms. The terms are used only for the purpose of distinguishing one component from another component. For example, without departing from the scope of the present invention, a first component may be referred to as a second component, and similarly, a second component may also be referred to as a first component. Unless the context clearly dictates otherwise, the singular form includes the plural form.

It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof. Further, when a portion of a layer, a film, a region, a plate, or the like is referred to as being "on" other portion, this includes not only a case in which the portion is "directly on" the other portion but also a case in which another portion is present between the portion and the other portion. Contrarily, when a portion of a layer, a film, a region, a plate, or the like is referred to as being "under" other portion, this includes not only a case in which the portion is "directly under" the other portion but also a case in which another portion is present between the portion and the other portion.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about."

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In an aspect, provided is a method of manufacturing a support for a catalyst of a fuel cell. The method may include preparing an admixture including a carbon material and a cerium precursor into a reactor, providing the admixture into a reactor; increasing a temperature of the reactor to a predetermined temperature, and introducing water vapor into the reactor to cause an activation reaction of the carbon material.

An average particle size of the carbon material may be less than or equal to about 500 μm. A lower limit of the average particle size of the carbon material is not particularly limited but may be greater than or equal to about 100 μm, about 200 μm, or about 300 μm. When the average particle size of the carbon material is greater than about 500 μm, when an electrode is manufactured after a catalyst is synthesized, performance and durability may be degraded due to non-uniformity in roughness of a surface of an electrode.

A specific surface area of the carbon material may be less than or equal to about 100 m$^2$/g. A lower limit of the specific surface area of the carbon material is not particularly limited but may be greater than or equal to about 30 m$^2$/g, about 50 m$^2$/g, or about 70 m$^2$/g. When the specific surface area of the carbon material is greater than about 100 m$^2$/g, it is difficult to control the specific surface area and a pore structure during activation of the water vapor so that there may be a problem in that a pore property of the carbon material become non-uniform.

The carbon material may include at least one selected from the group consisting of carbon black, carbon nanotubes, carbon nanofibers, graphite carbon, graphene, graphene oxide, and a combination thereof.

The cerium precursor may include one or more selected from the group consisting of cerium nitrate ($Ce(NO_3)_3$), cerium nitrate hydrate ($Ce(NO_3)_3 \cdot 6H_2O$), and a combination thereof.

The mixture may include an amount of 100 parts by weight of the carbon material, and an amount of about 5 to 20 parts by weight of the cerium precursor. When a content of the cerium precursor is less than about 5 parts by weight, cerium oxide may not be supported on the carbon material, and when the content of the cerium precursor is greater than about 20 parts by weight, it is difficult to support the catalyst due to excessive cerium oxide, and when an electrode is manufactured using the present carbon material, there may be a problem in that performance is degraded.

A type of the reactor is not particularly limited, and, for example, a tube furnace, a box furnace, or the like may be used as the reactor.

A temperature of the reactor may be raised to a predetermined temperature, and in order to prevent introduction of an impurity, the temperature may be raised while an inert gas is injected into the reactor.

The inert gas may include argon gas or nitrogen gas having a purity of 99.9% or greater.

The predetermined temperature may range from about 600° C. to about 950° C. Increasing the temperature of the reactor to the predetermined temperature may mean increasing an internal temperature of the reactor, and raising a temperature of the mixture in the reactor to a predetermined temperature. When the temperature of the reactor is less than about 600° C., the activation reaction of the carbon material, which will be described below, may occur.

Meanwhile, activation of a support containing a carbon-based material generally proceeds at a temperature is greater than about 950° C. However, since cerium oxide resulting from the cerium precursor may serve as a catalyst with respect to an activation reaction of the carbon material, a temperature of the activation reaction may be decreases.

The temperature of the reactor may be increased at a rate ranging from about 10° C./min to about 20° C./min. When the temperature rising rate is greater than about 20° C./min, physicochemical damage to the carbon material may occur due to a sudden temperature change.

When the temperature of the reactor reaches a predetermined temperature, water vapor may be introduced into the reactor to cause the activation reaction of the carbon material. FIG. 1 shows the activation reaction of the carbon material. When a carbon material 10 comes into contact with water vapor at a predetermined temperature, carbon monoxide (CO), hydrogen ($H_2$), carbon dioxide ($CO_2$), and the like are synthesized. As such, during the above process, a carbon element of the carbon material may be released, and a pore and a specific surface area of the carbon material may be increased.

A carbon material 10' activated as described above may have a pore size ranging from about 2 nm to about 8 nm. When the pore size of the activated carbon material 10' fall within the above range, the specific surface area of the support may be improved to a satisfactory level.

In addition, in the process of raising the temperature of the reactor and introducing the water vapor, the cerium precursor mixed with the carbon material may be converted into cerium oxide and supported on a surface of the carbon material. As shown in FIG. 1, the cerium oxide may serve as a catalyst with respect to the activation reaction of the carbon material. Thus, the temperature of the reactor may be reduced to about 950° C. or less, or particularly in the range of about 600° C. to about 950° C., which is a temperature that is less than a conventional temperature.

Meanwhile, instead of putting the cerium oxide in a state of a powder as in the prior art, the cerium oxide may be obtained from the cerium precursor so that the cerium oxide may be supported on the surface of the carbon material in a nano size. Preferably, an average particle size of the cerium oxide may be less than or equal to about 100 nm. A lower limit of the average particle size of the cerium oxide is not particularly limited but may be greater than or equal to, for example, about 10 nm, about 30 nm, or about 50 nm.

Figure 2:
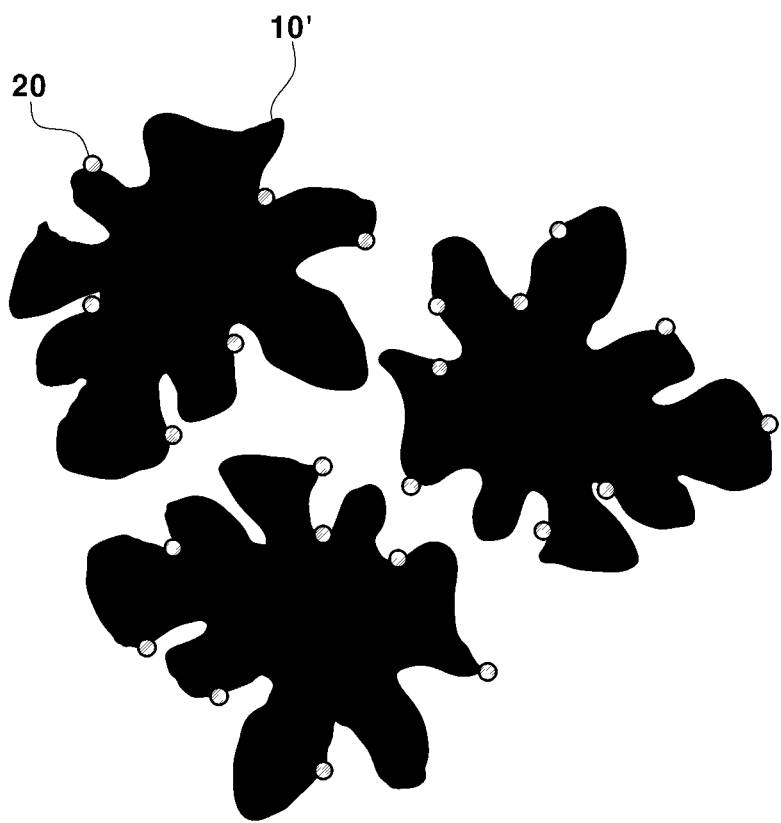
FIG. 2 shows an exemplary support obtained by an exemplary manufacturing method according to an exemplary embodiment of the present invention.

Consequently, according to the present invention, as shown in FIG. 2, a support containing the activated carbon material 10' with the increased pores and specific surface area may be obtained and a cerium oxide 20 may be supported on the support.

A manufacturing method of a catalyst for a fuel cell according to the present invention may be to support a catalyst metal on the support.

The catalyst metal is not particularly limited and may be platinum or a platinum alloy. The platinum alloy may be a metal alloy including platinum and at least one selected from the group consisting of gold, silver, cobalt, nickel, iron, palladium, ruthenium, titanium, vanadium, chromium, and a combination thereof.

The method of supporting the catalyst metal is not particularly limited. For example, after putting the support and the precursor of the catalyst metal into a solvent, the precursor of the catalyst metal may be reduced on a surface of the support, or the catalyst metal is deposited on the support to be supported thereon.

Also provided is a method of manufacturing an electrode for a fuel cell. The method may include preparing a slurry including the catalyst with an ionomer, an antioxidant, and the like, and applying the slurry onto a substrate and drying the slurry.

The ionomer is not particularly limited and may include a polymer material having cationic conductivity. For example, the ionomer may include perfluorosulfonic acid-based polymers such as Nafion and the like.

The antioxidant may include cerium oxide. The cerium oxide added in the process of manufacturing the electrode is distinguished from the nano-sized cerium oxide 20 supported on the above-described activated carbon material 10'. In addition, when an amount of the nano-sized cerium oxide 20 supported on the activated carbon material 10' is sufficient, the antioxidant may not be added to the slurry.

According to various exemplary embodiments of the present invention, a support for a catalyst of a fuel cell having an increased specific surface area and an increased pore size can be obtained.

According to various exemplary embodiments of the present invention, a temperature of an activation process of the support can be lowered so that a process time and costs can be significantly reduced.

According to various exemplary embodiments of the present invention, since nano-sized cerium oxide can be supported on the support, chemical durability of the fuel cell can be significantly improved.

The effects of the present invention are not limited to the above-described effects. It should be understood that the effects of the present invention include all effects which can be inferred from the above description.

Although the embodiments of the present invention have been described in detail, the scope of the present invention is not limited to these embodiments, and various modifications and improvements devised by those skilled in the art using the fundamental concept of the present invention, which is defined by the appended claims, further fall within the scope of the present invention.

What is claimed is:

1. A method of manufacturing a support for a catalyst of a fuel cell, comprising:
   preparing an admixture comprising a carbon material and a cerium precursor;
   providing the admixture into a reactor;
   increasing a temperature of the reactor to a predetermined temperature; and
   introducing water vapor into the reactor to perform an activation reaction of the carbon material.

2. The method of claim 1, wherein an average particle size of the carbon material is less than or equal to about 500 μm.

3. The method of claim 1, wherein a specific surface area of the carbon material is less than or equal to about 100 $m^2/g$.

4. The method of claim 1, wherein the carbon material comprises one or more selected from the group consisting of carbon black, carbon nanotubes, carbon nanofibers, graphite carbon, graphene, and graphene oxide.

5. The method of claim 1, wherein the cerium precursor comprises one or more selected from the group consisting of cerium nitrate ($Ce(NO_3)_3$), cerium nitrate hydrate ($Ce(NO_3)_3 \cdot 6H_2O$), and a combination thereof.

6. The method of claim 1, wherein the mixture comprises an amount of 100 parts by weight of the carbon material, and an amount of about 5 to 20 parts by weight of the cerium precursor.

7. The method of claim 1, wherein a temperature of the reactor is increased to a predetermined temperature while an inert gas is injected into the reactor.

8. The method of claim 1, wherein the predetermined temperature ranges from about 600° C. to about 950° C.

9. The method of claim 1, wherein the temperature of the reactor is increased at a rate ranging from about 10° C./min to about 20° C./min.

10. The method of claim 1, wherein pores and a specific surface area of the carbon material are increased through the activation reaction.

11. The method of claim 1, wherein a pore size of the activated carbon material ranges from about 2 nm to about 8 nm.

12. The method of claim 1, wherein the cerium precursor is supported on the carbon material which is activated in a form of cerium oxide.

13. The method of claim 12, wherein an average particle size of the cerium oxide is less than or equal to about 100 nm.

14. A method of manufacturing a catalyst for a fuel cell, comprising
 providing a catalyst metal on a support manufactured by a method of claim 1.

* * * * *